(12) United States Patent
Kopicki

(10) Patent No.: US 10,099,369 B2
(45) Date of Patent: Oct. 16, 2018

(54) GRASP MODELLING

(71) Applicant: The University of Birmingham, Birmingham (GB)

(72) Inventor: Marek Kopicki, West Midlands (GB)

(73) Assignee: The University of Birmingham, Birmingham (GB)

( * ) Notice: Subject to any disclaimer, the term of this patent is extended or adjusted under 35 U.S.C. 154(b) by 0 days.

(21) Appl. No.: 14/892,797

(22) PCT Filed: May 21, 2014

(86) PCT No.: PCT/GB2014/051546
§ 371 (c)(1),
(2) Date: Nov. 20, 2015

(87) PCT Pub. No.: WO2014/188177
PCT Pub. Date: Nov. 27, 2014

(65) Prior Publication Data
US 2016/0101519 A1    Apr. 14, 2016

(30) Foreign Application Priority Data

May 21, 2013    (GB) .................................. 1309156.6

(51) Int. Cl.
*B25J 9/16*    (2006.01)
(52) U.S. Cl.
CPC ............. *B25J 9/1612* (2013.01); *B25J 9/163* (2013.01); *B25J 9/1697* (2013.01); *G05B 2219/39543* (2013.01); *Y10S 901/36* (2013.01)

(58) Field of Classification Search
CPC ................ B25J 9/1612; B25J 15/0009; G05B 2219/39543
See application file for complete search history.

(56) References Cited

U.S. PATENT DOCUMENTS 5,673,367 A    9/1997    Buckley
5,845,048 A *  12/1998   Masumoto ............. B25J 9/1697
                                                706/20

(Continued)

OTHER PUBLICATIONS

Uno et al., "A Computational Model for Recognizing Objects and Planning Hand Shapes in Grasping Movements," Neural Networks, vol. 8, No. 6, pp. 839-851, sections 3 & 4 (1995).

(Continued)

*Primary Examiner* — Timothy R Waggoner
(74) *Attorney, Agent, or Firm* — Michael Best & Friedrich LLP

(57) ABSTRACT

A method of generating a configuration of a robotic hand for automatically grasping a first object, the robotic hand comprising a plurality of parts, is provided. The method comprises: receiving data representing the first object; receiving a plurality of first models generated based upon an example grasp of a second object, the example grasp being based upon a configuration of the robotic hand for grasping the second object in which a plurality of parts of said hand contact said second object, each of said plurality of first models representing a relationship between a respective part of the robotic hand and a property of the second object associated with said part of the robotic hand; and processing the data representing the first object based upon the plurality of first models to determine said configuration of the robotic hand for automatically grasping the first object.

20 Claims, 4 Drawing Sheets

(56) References Cited

U.S. PATENT DOCUMENTS

| | | | | |
|---|---|---|---|---|
| 9,095,978 | B2* | 8/2015 | Shi | B25J 9/1633 |
| 2011/0010009 | A1* | 1/2011 | Saito | B25J 9/1612 |
| | | | | 700/253 |
| 2012/0072022 | A1* | 3/2012 | Kim | B25J 9/1612 |
| | | | | 700/255 |
| 2013/0211593 | A1* | 8/2013 | Domae | B25J 9/1612 |
| | | | | 700/258 |
| 2013/0245822 | A1* | 9/2013 | Kawanami | B25J 9/1669 |
| | | | | 700/245 |
| 2014/0277742 | A1* | 9/2014 | Wells | B25J 9/1612 |
| | | | | 700/264 |

OTHER PUBLICATIONS

GB1309156.6 Search Report from the Intellectual Property Office of the United Kingdom dated Nov. 20, 2013 (1 page).

International Search Report and Written Opinion for International Application No. PCT/GB2014/061546 dated Oct. 30, 2014 (11 pages).

Abdeslam Boularias et al: "Learning robot grasping from 3-D images with Markov Random Fields", Intelligent Robots and Systems (IROS), 2011 IEEE/RSJ International Conference on, IEEE, Sep. 25, 2011 (Sep. 25, 2011), pp. 1548-1553, XP032060510, DOI: 10.1109/IROS.2011.6048528 ISBN: 978-1-61284-454-1 Abstract; p. 1549-p. 1552; figure 1.

Detry Renaud et al: "Learning a dictionary of prototypical grasp-predicting parts from grasping experience", 2013 IEEE International Conference on Robotics and Automation (ICRA); May 6-10, 2013; Karlsruhe, Germany, IEEE, US, May 6, 2013 (May 6, 2013), pp. 601-608, XP032506517, ISSN: 1050-4729, DOI: 10.1109 / ICRA.2013.6630635 ISBN: 978-1-4673-5641-1 [retrieved on Oct. 13, 2013] p. 601, right-hand column, last paragraph—p. 602, left-hand column p. 603-p. 606.

Detry R et al: "Learning object-specific grasp affordance densities", Development and Learning, 2009. ICDL 2009. IEEE 8th International Conference on, IEEE, Piscataway, NJ, USA, Jun. 5, 2009 (Jun. 5, 2009), pp. 1-7, XP031497733, ISBN: 978-1-4244-4117-4 Sections I, III, IV, V and VII.

Renaud Detry et al: "Generalizing grasps across partly similar objects", Robotics and Automation (ICRA), 2012 IEEE International Conference on, IEEE, May 14, 2012 (May 14, 2012), pp. 3791-3797, XP032450723, DOI: 10.1109/ICRA.2012.6224992 ISBN: 978-1-4673-1403-9 Sections II-V.

Rusu R B et al: "Perception for mobile manipulation and grasping using active stereo", Humanoid Robots, 2009. Humanoids 2009. 9th IEEE-RAS International Confernce on, IEEE, Piscataway, NJ, USA, Dec. 7, 2009 (Dec. 7, 2009), pp. 632-638, XP031609276, ISBN: 978-1-4244-4597-4 Sections III-VII.

* cited by examiner

GRASP MODELLING

FIELD

The present invention relates to methods and apparatus for automatically grasping an object using a robotic hand.

SUMMARY

Robotic devices that allow objects to be grasped have many uses. For example, in industrial processes it is often desirable for objects to be grasped so that they can be automatically manipulated without requiring human intervention in the industrial process.

Robotic devices that grasp objects having substantially the same shape, orientation and location have been used in such industrial processes with some success. For example, the robotic device can be taught how to grasp an example object and provided that a subsequent object to be grasped has substantially the same shape, orientation and location relate to the robotic device the robotic device can repeat the grasp for the example object to grasp the subsequent object. It is however desirable for a robotic device to be able to grasp objects that do not have the same shape as a previously presented object, or that are not orientated or located in the same position as the previously presented object and in such circumstances repeating a grasp for the previously presented object will typically fail.

Generalizing learned grasps to novel objects is an open problem. "Generalization of Human Grasping for Multi-Fingered Robot Hands", Ben Amor et. al., International Conference on Intelligent Robots and Systems, 2012 describes an imitation learning approach for learning and generalizing grasping skills based on human demonstrations in which efficient grasping representations are learned from human demonstrations, contact points are warped onto new objects and reach and grasp movements are optimized and executed. "Transferring Functional Grasps through Contact Warping and Local Replanning", Hillenbrand and Roa, International Conference on Intelligent Robots and Systems, 2012, describes a method for transferring grasps between objects of the same functional category, that is objects that have corresponding parts but which parts may differ in shape. For example, a large number of objects of varying shapes and sizes may fall within a functional category "teacups" in which each object in the category has a handle part and a part for containing liquid. In the methods of Hillenbrand and Roa the surface geometry of a source object is warped onto a target object, with the contact points of a grasp of the source object also being warped. However each of these approaches rely upon complete three-dimensional data of the new object to be grasped, which is not always available and additionally require that a novel object is of the same functional category as a training object.

"Learning Grasp Strategies with Partial Shape Information", Saxena et. al, Proceedings of the 23rd national conference on Artificial intelligence—Volume 3, 2008 proposes an approach to grasping that estimates the stability of different grasps using a classifier to compute a set of image features and to predict the probability of each point in the image being a candidate grasping point. Whilst the approach of Saxena can use noisy estimates of shape of visible portions of an object, there remains a need for improvements in generalizing learned grasps to novel objects.

It is an object of embodiments of the present invention to obviate or mitigate one or more of the problems set out above.

According to a first aspect of the present invention, there is provided a method of generating a configuration of a robotic hand for automatically grasping a first object, the robotic hand comprising a plurality of parts. The method comprises receiving data representing the first object and receiving a plurality of first models generated based upon an example grasp of a second object, the example grasp being based upon a configuration of the robotic hand for grasping the second object in which a plurality of parts of said hand contact said second object, each of said plurality of first models representing a relationship between a respective part of the robotic hand and a property of the second object associated with said part of the robotic hand. The data representing the object is processed based upon the plurality of first models to determine the configuration of the robotic hand for automatically grasping the first object.

Using a plurality of models generated based upon an example grasp in this way allows a spatial relationship between each part of the robotic hand and the first object to be evaluated for each robotic hand part (sometimes referred to as a rigid link) independently of other robotic hand parts to determine an optimal spatial relationship between each part of the robotic hand and the first object that is to be grasped. The optimal spatial relationship for each part can then be used to evaluate possible grasps starting from each of the robotic hand parts and provides a more flexible approach to determining possible grasps. Such a more flexible approach based upon a plurality of models associated with robotic hand parts allows incomplete data representing the object to be grasped to be used to determine a grasp, and additionally improves the ability to generalise grasps to novel objects.

Processing the data representing the object based upon the plurality of first models may comprise determining a relationship between each of the plurality of first models and the data representing the object associated with a plurality of locations of the first object. The configuration of the robotic hand for automatically grasping the first object may be determined based upon the determined relationships for the plurality of first models. For example for each of the plurality of first models a correspondence between the property of the second object associated with the part modelled by the first model and a property of each of a plurality of subsets of the data representing the first object may be determined.

Determining a relationship between each of the plurality of first models and the data representing the first object may comprise, for each of the first models, determining correspondence between the property of the second object associated with the respective part of the robotic hand and a property of each of the plurality of locations of the first object. The configuration of the robotic hand for automatically grasping the first object may be determined based upon the determined correspondence. Each of the plurality of locations may represent a possible location for a respective hand part associated with one of the first models for a configuration of the robotic hand for grasping the first object.

A correspondence may for example be determined for each model and each of the plurality of locations of the first object, and a configuration of the robotic hand may be determined based upon the plurality of locations that optimises the correspondence. Correspondence between the property of the second object associated with the respective part of the robotic hand and a property of each of the plurality of locations of the first object may for example be determined using Monte Carlo integration.

The property may be a property generated based upon data representing the respective object associated with a region of the respective object that has a predetermined spatial relationship with the respective part of the robotic hand when the respective object is grasped in the example grasp. For example, the property of the second object represented by each first model may be a property of a region of the second object that is located closest to the respective part of the robotic hand in the example grasp. Similarly the property of the first object may be a property of a region of the first object that is located closest to the respective part of the robotic hand in a selected configuration of the robotic hand, for example a configuration that is to be tested to determine whether the configuration is a suitable configuration, as described in further detail below.

The predetermined spatial relationship may for example be based upon contact between the respective part of the robotic hand and the respective object. That is, the region of the first or second object may be a region that is contacted during a selected configuration or during the example grasp respectively. Alternatively the predetermined spatial relationship may be based upon a part of the second object that is located closest to the respective part of the robotic hand.

The plurality of first models may comprise a first model for a subset of the parts of the robotic hand. The subset of the parts of the robotic hand may be selected based upon the predetermined spatial relationship of the robotic hand and the second object during the example grasp. For example, a first model may be generated for each part of the robotic hand that contacts the second object during the example grasp.

Each of the received plurality of first models may represent a relationship between a spatial arrangement of the respective part of the robotic hand relative to the second object and the property of the second object associated with the part of the robotic hand.

Each of the received plurality of first models may for example comprise a probability density function.

The property may be a property of a surface of the region of the first and/or second object. For example, the property may be based upon curvature of the surface of the region of the object associated with the respective part of the robotic hand. The curvature of the surface of the region of the object may be principal curvatures of the surface of the region of the object. Alternatively any property that may be used to determine correspondence between data representing objects may be used.

The method may further comprise receiving a second model generated based upon the example grasp, the second model representing a relationship between the plurality of parts of the robotic hand, wherein the data representing the object may be further processed based upon the second model to determine the configuration of the robotic hand for automatically grasping the first object.

The method may further comprise receiving a second model generated based upon the example grasp, the second model representing a relationship between the plurality of parts of the robotic hand, wherein the data representing the object may be further processed based upon the second model to determine the configuration of the robotic hand for automatically grasping the first object.

It will be appreciated that the additional flexibility provided by the use of multiple models may in some circumstances result in a large possible search space to determine an optimal grasp. The second model representing a relationship between the plurality of parts of the robotic hand can be used to constrain the search space for possible grasps by restricting combinations of first models with locations of the first object that are processed.

For example, a plurality of configurations of the robotic hand may be considered to determine, based upon the first models, the relationship between regions of the second object in the example grasp that are associated with the parts of the robotic hand and regions of the first object determined by the configurations. It will be appreciated that a large number of possible combinations of hand parts and regions of the first object will typically be possible, in particular when the robotic hand has a plurality of parts. The second model allows the possible combinations that are considered to be restricted.

Processing the data representing the first object may comprise determining a relationship between at least one of the plurality of first models and a location associated with the first object based upon the second model.

Determining a relationship between at least one of the plurality of first models and a location associated with the first object based upon the second model may comprise determining a location associated with a selected one of the first models based upon a relationship between the selected one of the plurality of first models and the data representing the first object, determining a configuration of the robotic hand based upon the determined location associated with the selected one of the first models; and determining a location associated with the at least one of the plurality of first models based upon the determined configuration.

For example, a first model may be selected and processed with respect to the first object to determine a location with respect to the first object for the hand part associated with the selected first model. The location of the hand part may for example be determined based upon a part of the first object that provides a maximum correspondence with the part of the second object associated with the first model. The location of the hand part associated with the selected first model may then be used to select a configuration of all other hand parts based upon the second model. In particular, the second model may be used to determine locations of the other hand parts that are permitted given the location of the hand part associated with the selected first model.

The method may further comprise generating a score associated with the determined configuration of the robotic hand, the score being determined based upon a relationship between the at least one of the plurality of first models and the data representing the first object associated with the determined location. For example, the score may indicate a combined correspondence between the parts of the second object associated with each of the respective first models and the parts of the first object determined by the configuration.

The method may further comprise determining a location associated with each of the plurality of first models based upon the determined configuration. The score may be determined based upon a relationship between each of the plurality of first models and the associated locations. That is, each of the first models may be used to determine a location and a configuration may be determined based upon the location for each location.

The method may further comprise generating a plurality of scores based upon a plurality of determined configurations of the robotic hand, each configuration of the robotic hand being based upon a determined location associated with a different selected one of the first models. The configuration of the robotic hand for automatically grasping the first object may be determined based upon said plurality of scores.

The or each of the first models may be used to determine a plurality of locations and a configuration may be determined for each of the plurality of locations. For example, a predetermined number of locations that provide maximum correspondence may be used to determine configurations and associated scores for the or each first model and the final configuration may be based upon a configuration that provides the greatest combined correspondence from all of the first models.

The relationship between the plurality of parts of the robotic hand represented by the second model may comprise a relationship between the plurality of parts of the robotic hand when the robotic hand is in contact with the second object during the example grasp. Additionally or alternatively the relationship between the plurality of parts of the robotic hand represented by the second model may comprise a relationship between the plurality of parts of the robotic hand prior to the robotic hand contacting the second object during the example grasp.

For example the example grasp may comprise both a configuration of the parts of the robotic hand during contact with the second object and additional configuration of the parts of the robotic hand during a time period in which the robotic hand approaches the second object. The second model may encode the configuration of the parts of the robotic hand both during the approach of the robotic and during contact of the robotic hand. The configurations of the robotic hand used to determine correspondence described above may therefore have some flexibility based upon the approach to the second object.

The data representing the first object may comprise image data and/or depth data and/or any other suitable data for determining a property of an object.

The received plurality of first models may be generated based upon a plurality of example grasps of a second object. Alternatively or additional the received plurality of first models may be generated based upon a plurality of example grasps, each of the plurality of example grasps being associated with a respective second object. For example, the first models may encode a plurality of grasps of the same general form of the same object or of different objects.

The robotic hand may be any device having two or more parts moveable relative to one another that is able to grasp an object.

At least two of the plurality of first models may represent a relationship between the same part of the robotic hand. The relationship between a respective part of the robotic hand and a property of the second object associated with the part of the robotic hand may be based upon a three-dimensional space defined relative to the part of the robotic hand. The three-dimensional shape may be any suitable shape. Points defined within the shape may have associated weighting functions that are used in the processing to determine the configuration of the robotic hand for automatically grasping the first object and the weighting functions may take any convenient form. The three-dimensional spaces and/or weighting functions may be determined using machine learning techniques.

Processing the data representing the first object based upon the plurality of first models may comprise combining data associated with a plurality of first models using a product of mixtures approach. The plurality of models for which data is combined may be determined using machine learning techniques.

It will be appreciated that aspects of the invention can be implemented in any convenient form. For example, the invention may be implemented by appropriate computer programs which may be carried on appropriate carrier media which may be tangible carrier media (e.g. disks) or intangible carrier media (e.g. communications signals). Aspects of the invention may also be implemented using suitable apparatus which may take the form of programmable computers running computer programs arranged to implement the invention. The invention may for example be carried out using a computer embedded in a robotic hand. That is, the invention may comprise a robotic hand arranged to automatically grasp an object according to the methods set out above and described herein.

BRIEF DESCRIPTION OF THE DRAWINGS

Embodiments of various aspects of the present invention will now be described, by way of example only, with reference to the accompanying drawings, in which.

DETAILED DESCRIPTION

Figure 1:
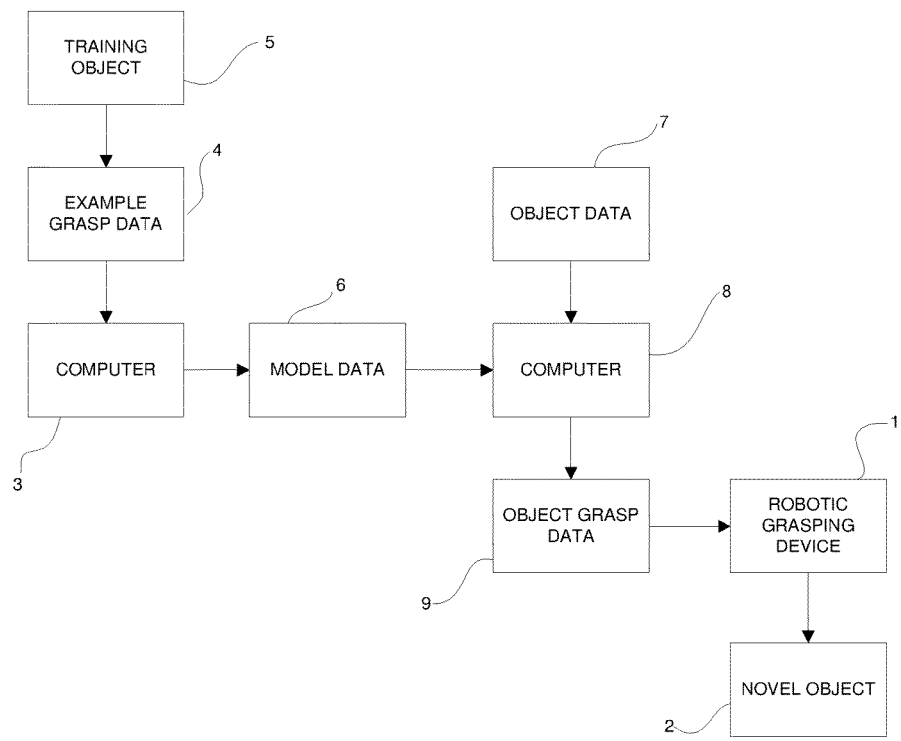
FIG. 1 is a schematic diagram of a system for automatically grasping an object in accordance with an embodiment of the invention.

Referring first to FIG. 1 a system for controlling a robotic hand 1 is shown. The robotic hand 1 comprises a plurality n of parts $H_i$, i=1 . . . n, that are moveable relative to one another and that can be controlled to grasp a novel object 2. The plurality of parts $H_i$ that are moveable relative to one another comprise two or more grasping parts moveable relative to one another to grasp an object, as well as other parts that allow the two or more grasping parts to be moved relative to the novel object 2. For example, the robotic hand 1 may comprise a hand attached to an arm. The hand may comprise a palm with one or more degrees of freedom that allow parts of the palm to be moved relative to one another and two or more fingers with one or more degrees of freedom. For example the robotic hand 1 may comprise a plurality of parts that are generally arranged to simulate the movement of a human arm and hand.

A computer 3 is arranged to receive example grasp data 4 associated with a grasp of the training object 5. The example grasp data 4 may for example be data associated with grasping the training object that is generated based upon manual manipulation of the robotic hand 1 to grasp the training object 5 or alternatively the training object 5 may be a virtual training object and the grasp data may be generated by simulating a grasp of the virtual training object using appropriate computer software.

The computer 3 is arranged to process the example grasp data 4 to generate model data 6. The model data 6 comprises a plurality of contact models $M_i$ each contact model $M_i$ corresponding to a respective part of the robotic hand $H_i$, each contact model $M_i$ representing a relationship between the part of the robotic hand $H_i$ and a property of the training object. For example, the model data may comprise a model for each of the plurality of parts of the robotic hand that contact the training object 5 in the grasp used to generate the grasp data 4, and each model may model a statistical distribution of features of a surface region of the training object associated with a region (that may be modelled for example as a point) at which the hand contacts the training object 5. It will of course be appreciated that more than one training object may be used and the model data may model a relationship between the respective part of the robotic hand and a property of each of the training objects.

The model data may additionally comprise a configuration model C that encodes the configuration of all of the parts of the robotic hand $H_i$ for the grasp of the training object 5 when the object is grasped and additionally the configuration of the parts $H_i$ as the robotic hand approaches the configuration used to grasp the training object.

The model data 6 is processed together with object data 7 associated with the novel object 2 that is to be grasped by a computer 8 to generate object grasp data 9 for grasping the novel object 2 using the robotic hand 1. The computer 8 may be the same computer as computer 3 or alternatively computers 3 and 8 may be separate computers and the model data 6 may be provided from computer 3 to computer 8 in any convenient way, for example using an appropriate communications network.

In general terms and as described in detail below, the object data 7 provides data associated with the property that is modelled by the model data 6. The computer processes the models with respect to a plurality of features of the novel object determined from the object data 7 to determine regions of the novel object that are similar to regions of the training object 5 that have a predetermined spatial relationship with the robotic hand 1 in the grasp used to generate the grasp data 4. That is, the models are used to determine regions of the novel object 2 for which the property that is modelled by the model data 6 has a high correspondence with the property of the region of the training object 5. For example, the predetermined spatial relationship may be based upon contact with the object in the grasp used to generate the grasp data 4. The configuration model is used to reduce the search space across the plurality of models based upon the configuration of the plurality of parts of the robotic hand in the grasp used to generate the grasp data 4.

Figure 2:
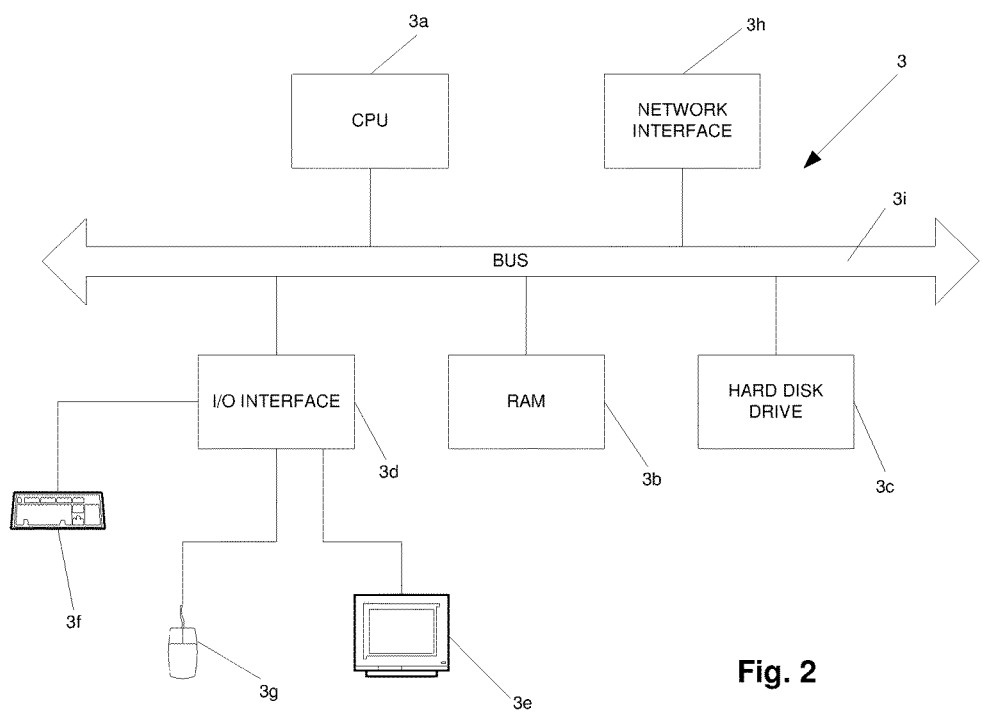
FIG. 2 is a schematic diagram of a computer of the system of FIG. 1.

FIG. 2 shows the computer 3 in further detail, although it will be appreciated that where computer 8 is a different computer to computer 3 it will typically have the same general structure. It can be seen that the computer comprises a CPU 3a which is configured to read and execute instructions stored in a volatile memory 3b which takes the form of a random access memory. The volatile memory 3b stores instructions for execution by the CPU 3a and data used by those instructions. For example, in use, data such as example grasp data 4, model data 6, object data 7 and object grasp data 9 may be stored in volatile memory 3b.

The computer 3 further comprises non-volatile storage in the form of a hard disc drive 3c. Data such as example grasp data 4, model data 6, object data 7 and object grasp data 9 may be stored on hard disc drive 3c and processed together. The computer 3 further comprises an I/O interface 3d to which are connected peripheral devices used in connection with the computer 3. More particularly, a display 3e is configured so as to display output from the computer 3 such as data used in the simulation of a grasp. Input devices are also connected to the I/O interface 3d. Such input devices may include a keyboard 3f and a mouse 3g which allow user interaction with the computer 3. It will be appreciated that the computer may have other input interfaces, for example robotic hand 1 may be arranged in communication with computer 3 to provide computer 3 with data associated with the configuration of the plurality of parts of the robotic hand during a manually controlled training grasp. A network interface 3h allows the computer 3 to be connected to an appropriate communications network so as to receive and transmit data from and to other computers such as computer 8. The CPU 3a, volatile memory 3b, hard disc drive 3c, I/O interface 3d, and network interface 3h, are connected together by a bus 3i.

Figure 3:
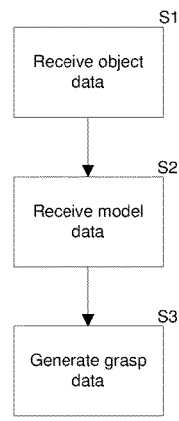
FIG. 3 is a flowchart showing processing to generate a configuration of a robotic hand for automatically grasping a novel object in accordance with the invention.
Figure 4:
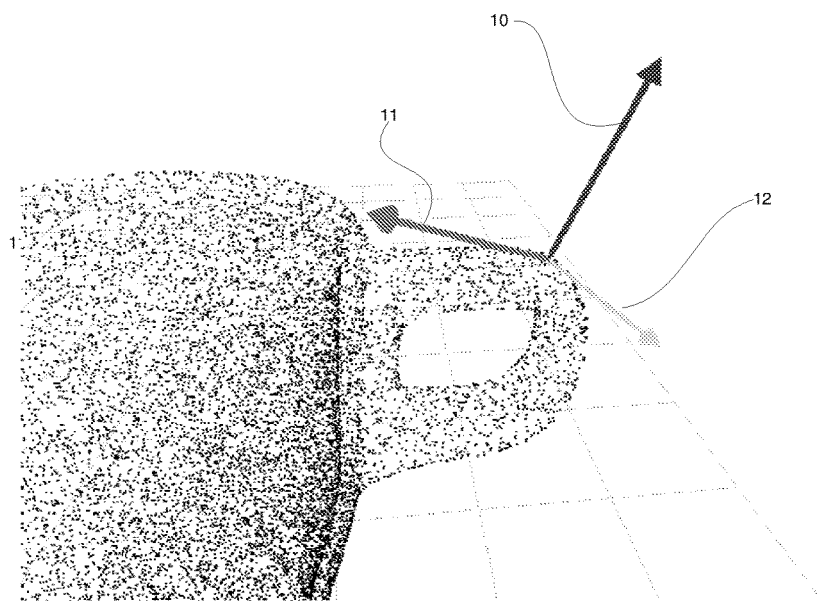
FIG. 4 is a point cloud representing an object suitable for use with the invention.

Referring to FIG. 3, processing to generate a configuration of a robotic hand for automatically grasping a novel object is shown. At step S1 data representing the novel object to be grasped O is received. The data O comprises data that allows a property of the novel object to be determined at a plurality of locations. The property may be any physical property that can be determined for objects from which correspondence between points of objects can be determined and is generally a property of points of the surface of the object.

For example the data O may comprise a point cloud of at least part of the surface of the novel object, the point cloud providing a three-dimensional representation of the surface of the novel object and being generated based upon image data representing the object. The property may be any property that can be determined from the point cloud such as for example principal curvatures of points p of the surface, the principal curvatures indicating curvature in a direction in a plane tangential to the surface of the object and curvature in a direction in a plane perpendicular to the surface normal. An example point cloud of a cup is shown in FIG. 3 in which each dot represents a point on the surface of the cup. FIG. 3 also shows rays representing surface normals of a plurality of points and principal curvatures of those points.

At step S2 model data is received, the model data being generated based upon a training grasp of a training object. As described above, the model data comprises a plurality of contact models $M_i$, and may additionally comprise a configuration model C, which are described in further detail below.

In general terms each contact model $M_i$ models the distribution of features of a region of the received object data that corresponds to a region of the object that is contacted by the part $H_i$ during the training grasp, and allows the model to be processed with respect to object data associated with a novel object to identify regions of the object that are similar to the region that is contacted during the training grasp.

In more detail, the model data comprises a plurality of contact models $M_i$, $i \subseteq \{1 \ldots n\}$, each contact model representing a relationship between a respective part of the robotic grasp device $H_i$ and a property of the training object associated with the part $H_i$ for the training grasp. A contact model may for example be generated for each part $H_i$ that contacts the object during the training grasp.

The property of the training object associated with the part $H_i$ is based upon the location of the part $H_i$ relative to the training object when the training object is grasped in the training grasp. For example, each contact model may be a probability density function and may be approximated by (1):

$$M_i(u, r) \cong \sum_l w_{il} N_3(p \mid \mu_{p_{il}}, \sigma_{p_{il}}) \Theta(q \mid \mu_{q_{il}}, \sigma_{q_{il}}) N_K(r \mid \mu_{r_l}, \sigma_r) \quad (1)$$

where:

u=(p,q) is a pose of the part $H_i$ relative to a feature frame, defined by a point in three-dimensional space p and an orientation in three-dimensional space represented by quaternion—a four-dimensional real vector q;

r is a K-dimensional vector defining the property of the training object to be modelled;

l is an index to a point in the region of the received object data that is to be modelled for part $H_i$, the feature having pose $v_l$ and property to be modelled $r_l$;

$$N_k(x \mid \mu, \sigma) = C\exp\left(-\frac{\|x-\mu\|^2}{\sigma^2}\right)$$

is a k-variate isotropic Gaussian kernel with mean µ, bandwidth σ and normalisation constant C;

$$\Theta(q \mid \mu, \sigma) = C\frac{\exp(\sigma\mu^T q) + \exp(-\sigma\mu^T q)}{2}$$

corresponds to a pair of von Mises Fisher distributions which forms a Gaussian-like distribution on SO(3), with mean µ, dispersion parameter σ and normalisation constant C;

$(\mu_{p_{il}}, \mu_{q_{il}})=u_{il}$ is the centre of a kernel computed based upon the geometric relation between $v_l$ and $s_i$ such that $s_i=v_l \circ u_{il}$, where $s_i=(p,q)$ is a pose of the part $H_i$ relative to a feature frame $v_l$. $s_i$ is associated with the hand part and remains fixed for all processing, defined by a point in three-dimensional space p and an orientation in three-dimensional space q.;

$(\sigma_{p_i}, \sigma_{q_i}, \sigma_r)$ are real value constants which define kernel bandwidth;

$w_{il}$ is a weight applied to point l based upon the distance between the point l and the part $H_i$ and may be determined based upon (2) below, where $$\sum_l w_{il} = 1.$$

As described above, the weight $w_{il}$ may be determined according to (2):

$$w_{il}=\exp(-\lambda\|v_l-a_{il}\|^2) \quad (2)$$

where:

$a_{il}$ is a point on the surface of part $H_i$ that is closest to point l and λ is a predetermined constant for the contact model.

The various components described above are illustrated in FIG. 5, which shows a part of the robotic hand 15 having an associated pose u in contact with an object at a region 16 of the object. A point 17 of the point cloud of the object corresponding to a point l described above is shown with associated components used in (1) above illustrated between the point l and the part of the robotic hand 15. In particular, as described above the point l has an associated pose represented by v and comprising a location in three-dimensional space p and an orientation q, together with an associated property r (not shown). As described above, a weight $w_l$ is determined for the point l based upon a distance between the shortest distance between the point l and the part of the robotic hand 15.

Each model $M_i$ generated according to (1) encodes the distribution of features in a region surrounding the part $H_i$, with the contribution of each point in the region surrounding the part $H_i$ being inversely proportional to the distance of the point any part of the point $H_i$ that contacts the object during the sample grasp.

At step S3 grasp data is generated based upon the object data received at step S1 and the model data received at step S2. In general terms the grasp data is generated by determining a correspondence between properties of the regions of the training object that is modelled by the contact models $M_i$ and properties of regions of the novel object to be grasped. The correspondence over poses of the object (v,r) ∈ O and points of the model (u,r) ∈ $M_i$, where v, u are poses of the form (p,q) for some position p and orientation q and r is the property of the point, can be described probabilistically by a query density $Q_i(s)$ where s is the set of all possible position and orientation combinations of part $H_i$ by (3):

$$Q_i(s)=Z_i\int P_i(s|v,u)O(v,r)M_i(u,r)dvdudr \quad (3)$$

where:

$Z_i$ is a normalization constant;

$P_i(s|v,u)$ is the conditional density and represents pose multiplications s=v∘u; and O and $M_i$ contribute to the weight of pose s and through the common property variable r and satisfy (4) below.

$$\int O(v,r)dvdr=1 \int M_i(v,r)dudr=1 \quad (4)$$

Using Bayes rule the integral (3) can be rewritten as (5):

$$Q_i(s)=Z_i\int P_i(s|v,u)O(r|v)O(v)M_i(r)dvdudr \quad (5)$$

The training object and the novel object are represented as a collection of surface features without uncertainties such that O(r|v) becomes a mapping r(v):v→r , which for any choice of v uniquely determines r, effectively removing integration over r such that (5) can be approximated as (6):

$$Q_i(s)\approx\int P_i(s|v,u)O(v)M_i(u|r(v))M_i(r(v))dvdu \quad (6)$$

Figure 6:
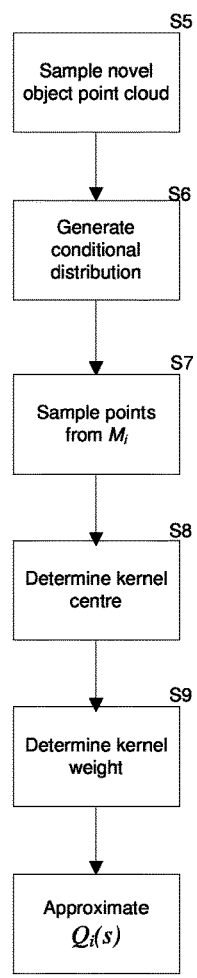
FIG. 6 is a flowchart showing processing to perform Monte Carlo integration.

$Q_i(s)$ can be computed directly using Monte Carlo integration in any convenient way, for example as described below with reference to FIG. 6.

At step S5 the point cloud representing the novel object O is sampled to randomly select a plurality of points, the plurality of points defining a surface feature $\hat{v}$~O with corresponding feature vector $\hat{r}$ and at step S6 a conditional distribution $M_i(u|\hat{r})$ is generated based upon the feature vector $\hat{r}$. At step S7 a plurality of points $\hat{u}$ are sampled from $M_i$, $\hat{u}$~$M_i(u|\hat{r})$. At step S8 a centre of a kernel ŝ corresponding to a possible position and orientation of the hand part $H_i$ is determined based upon the sampled values $\hat{u}$ and $\hat{v}$ according to $\hat{s}=\hat{v}\circ\hat{u}$ and at step S9 a weight w is determined for the kernel according to w=$M_i(\hat{r})$. At step S10 $Q_i(s)$ is approximated according to (7) below.

$$Q_i(s) \approx \sum_l w_{il}N_3(p \mid \mu_{\hat{p}_{il}}, \sigma_{p_i})\Theta(q \mid \mu_{\hat{q}_{il}}, \sigma_{q_i}) \quad (7)$$

where:

$(\mu_{\hat{p}_{il}}, \mu_{\hat{q}_{il}})=\hat{s}_{il}$ is the centre of the $l^{th}$ kernel computed at step S8;

$(\sigma_{p_i}, \sigma_{q_i})$ are real value constants which define kernel bandwidth;

$$\sum_l w_{il} = 1$$

are normalised weights.

A query density $Q_i(s)$ may be determined according to the above for each model $M_i$. Suitable grasps can then be determined by combining the query densities to determine a configuration of parts $H_i$ on the object for which the correspondence between regions of the training object grasped during the training grasp and regions of the novel object is greatest and for which the configuration of parts $H_i$ is possible given the constraints upon possible configuration of the parts $H_i$.

As described above, the model data may additionally include a configuration model C that encodes the configuration of all of the parts of the robotic hand $H_i$ for the grasp of the training object both during and prior to the grasp of the object. The configuration model C can be used to restrict the search space for the query densities as described below.

The configuration model may for example encode a set of configurations of the joints of the robotic hand $h \in R^D$, where D is the number of parts of the hand, for an example grasp. The configuration model C may additionally encode configurations of the robotic hand as the hand moves towards the training object for the training grasp to allow the configuration model to provide improved flexibility for the search space. The configuration model C may for example be constructed using kernel density estimation according to (8):

$$C(x) \equiv \sum_{\gamma \in [-\beta, \beta]} w(h(\gamma)) N_D(x \mid h(\gamma)) \quad (8)$$

where $w(h(\gamma)) = \exp(-\alpha \|h(\gamma) - h^g\|^2)$ and $\alpha$ is a positive constant; and $h(\gamma)$ is a set of configurations interpolated between $h^t$ and $h^g$ according to (9):

$$h(\gamma) = (1-\gamma)h^g + \gamma h^t \quad (9)$$

where:

$h^g$ is the joint angles of the robotic hand when the hand is grasping the training object during the training grasp;

$h^t$ is the joint angles at a predetermined distance before the hand grasps the training object during the training grasp; and $\gamma \in R$ and for all $\gamma < 0$, configurations $h(\gamma)$ are beyond $h^g$.

The configuration model may be used to determine a set of grasps by maximising (10):

$$h = \arg\max_{h_w, h_j} C(h_j) \prod_i Q_i(k_i^{for}(h_w, h_j)) \quad (10)$$

where:

$C(h_j)$ is the configuration model;

$Q_i$ is a query density corresponding to hand part $H_i$; and $k_i^{for}(h_w, h_j)$ is a forward kinematic function of the robotic hand with wrist pose $h_w$ and joint configuration $h_j$ that allows the position of the hand parts $H_i$ having corresponding densities $Q_i$ upon the novel object to be estimated based upon pose of the robotic hand $h = (h_w, h_j)$ modelled by the configuration model C.

Maximisation of (10) can be effected using a simulated annealing procedure as will now be described with reference to FIG. 7. At step S10 a part $H_i$ for which a corresponding density $Q_i$ exists (for example, a part that contacts the novel object during the training grasp) is selected at random and at step S11 a pose $s_i$ for part $H_i$ is determined by sampling from $Q_i$. At step S12 a configuration $h_j$ is selected from $C(h_j)$ at random, the configuration $h_j$ representing a configuration of the joints of the robotic hand in which hand part $H_i$ has pose $s_i$. Given that the configuration model $C(h_j)$ represents configurations in the approach to the object to be grasped the configuration $h_j$ may not be a configuration when the object is grasped and as such, at step S13, poses of the hand parts when the object is grasped are determined from the configuration $h_j$ using $k_i^{for}(h_w, h_j)$ to determine a robotic hand pose h representing a configuration of the hand parts when the object is grasped based upon the initial pose $s_i$.

At step S14 the configuration determined at step S13 is evaluated to determine a value for the robotic hand pose h based upon (10) by determining the product of the correspondence values determined based upon the models $Q_i$ of each hand part $H_j$ that contacts the novel object when the robotic hand grasps the object with robotic hand pose h.

At step S15 it is determined if more configurations are to be selected based upon the pose $s_i$ determined at step S11 and if more configurations are to be selected the processing of steps S12 to S15 are repeated to select a further robotic hand pose h and associated value, for example by selecting a configuration of the robotic hand that is at a different point in the training grasp movement towards the object. The further configuration may for example be selected based upon a previous configuration that has a highest associated value. The processing of steps S12 to S15 may for example be repeated 200 times, although it will of course be appreciated that the processing of steps S12 to S15 may be repeated any suitable predetermined number of times. The processing of steps S12 to S15 provides a greatest value for a configuration $h_j$ given starting pose $s_i$ selected at step S11.

Figure 7:
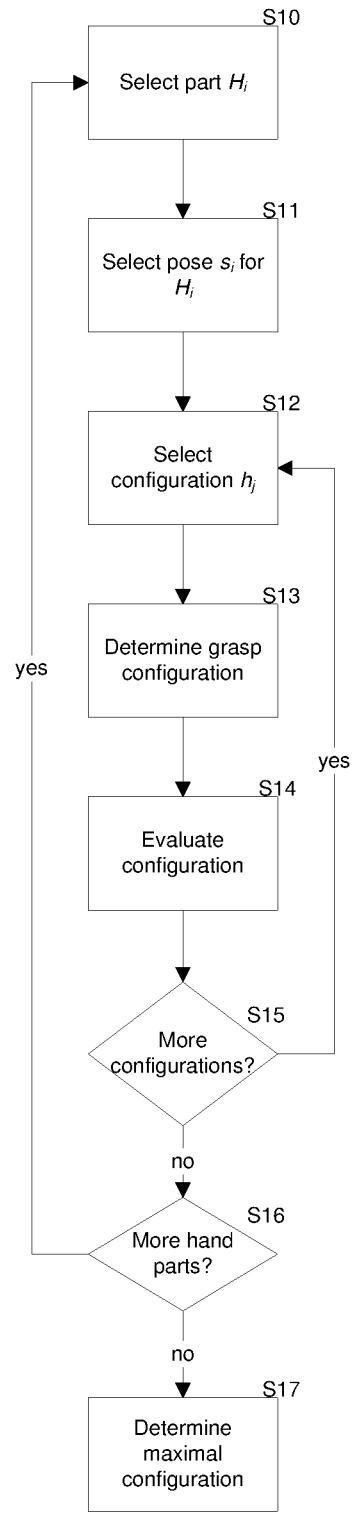
FIG. 7 is a flowchart showing processing to evaluate a plurality of grasps in accordance with an embodiment of the invention.

At step S16 it is determined whether more hand parts are to be processed as a starting point for the processing of FIG. 7 and if it is determined that more hand parts are to be processed a further hand part is selected at step S10 and the processing of FIG. 7 is repeated. The processing of FIG. 7 will typically be repeated based upon selection of each hand part that has a predetermined spatial relationship with the training object during the training grasp, for example that contacts the training object during the training grasp, multiple times, with a different pose $s_i$ being selected at step S11 each time the hand part is selected such that each hand part is evaluated for a plurality of configurations based upon a set of poses that provide maximal correspondence between the novel object, as determined using the models $Q_i$. For example, a large number of values may be determined for configurations $h_j$ given starting pose $s_i$ selected at step S11, for example 1000 or more, for different starting hand part and configuration combinations. Combinations that are not possible may be identified and removed, for example based upon known reachability and workspace constraints and the remaining best scoring configuration may be used to generate a grasp trajectory for grasping the novel object.

Whilst it is described above that a configuration model may be used to constrain the search space it will be appreciated that the search space can be constrained in any convenient way, for example based upon the movement of the hand towards the object.

Figure 5:
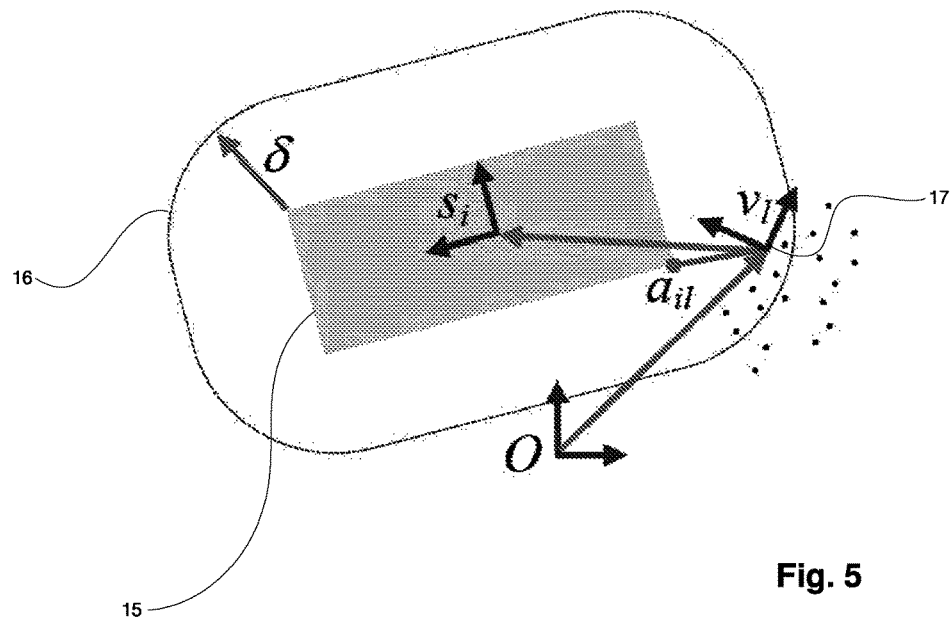
FIG. 5 is a schematic illustration of a part of a robotic hand in contact with a region of an object.

It is described above that the model data comprises a plurality of contact models $M_i$, $i \subseteq \{1 \ldots n\}$, each contact model representing a relationship between a respective part of a robotic grasp device $H_i$ and a property of the training object associated with the part $H_i$ for the training grasp. In some embodiments each part of the robotic grasp device $H_i$ may have one or more associated receptive fields defining a three-dimensional space volume rigidly attached to a particular hand link, the receptive field being denoted by $R_i$, i=1, . . . , N. Each receptive field can extend a distance $\delta \in R^+$ from a given part of a robotic grasp device $H_i$, for example as illustrated in FIG. 5.

Where receptive fields are associated with parts $H_i$ each contact model may represent a relationship between a receptive field and a property of the training object associated with the receptive field in a similar manner to that described above. For example, a contact model may be generated for each receptive field that intersects the object to be grasped during the training grasp. Each model may model a statistical distribution of features of a surface region of the training object associated with a region (that may be modelled for example as a point) at which the receptive field intersects the training object 5. Each contact model may be generated based upon a probability density model approximated according to (1) as described above, with weights $W_{ij}$ that exponentially decrease based upon the distance to the surface of the hand feature determined according to (2) as described above.

In this way, contact models may be generated based upon a relationship between the object to be grasped and receptive fields $R_i$ that are indicative of neighbourhoods important for grasping of an object. For example, a receptive field can be defined such that a greater importance is given to objects in a space in three dimensions in a particular direction relative to a hand part. Suitable receptive fields may be determined in any convenient way. For example receptive fields may be input by a user based upon user knowledge of important three dimensional spaces for a particular hand part, or alternatively receptive fields may be determined for an object using machine learning techniques as will be known to a person skilled in the art. Additionally, whilst it has been described above that weights are generated in a similar manner to that described above, it will be appreciated that weights may also be generated for receptive fields using machine learning techniques.

A grasp may be determined based upon receptive fields as described above with reference to FIG. 10. Alternatively, in some embodiments receptive fields may be arranged into collections $M_m$ and a hand pose h may be determined based upon collections of receptive fields using a product of mixtures approach according to (11):

$$h = \arg\max_{h_w, h_j} C(h_j) \prod_m \sum_{\phi \in M_m} Q_i(k_{l(i)}^{for}(h_w, h_j)) \quad (11)$$

where:

$C(h_j)$ is the configuration model as above;

$Q_i$ is a query density corresponding to receptive field $R_i$; and $k_{l(i)}^{for}(h_w, h_j)$ is a forward kinematic function of the robotic hand with wrist pose $h_w$ and joint configuration $h_j$ that allows the position of a hand part $h_{l(i)}$, where $l(i)$ is a mapping from receptive fields to hand parts given that each hand part may have a plurality of associated receptive fields, to be estimated based upon pose of the robotic hand $h=(h_w, h_j)$ modelled by the configuration model C.

The optimisation of (11) therefore maximises a product of the sum of query density values of each collection. By maximising over collections in this way, a relationship between associated receptive fields can be included in the evaluation such that the effect of associated receptive fields can be combined.

The optimisation of (11) may be carried out using a simulated annealing procedure as described above with reference to FIG. 7 but with receptive fields being selected in place of hand parts, or other suitable numerical optimisation procedure as will be known to a person skilled in the art.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A method of generating a configuration of a robotic hand for automatically grasping a first object, the robotic hand comprising a plurality of parts, the method comprising:
   receiving data representing the first object;
   receiving a plurality of first models generated based upon an example grasp of a second object, the example grasp being based upon a configuration of the robotic hand for grasping the second object in which a plurality of parts of said hand contact said second object, each of said plurality of first models representing a relationship between a respective part of the robotic hand and a property of the second object associated with said part of the robotic hand, wherein the relationship is independent of any other part of the robotic hand;
   receiving a second model generated based upon the example grasp, the second model representing a relationship between the plurality of parts of the robotic hand; and processing the data representing the first object based upon the plurality of first models to determine said configuration of the robotic hand for automatically grasping the first object.

2. A method according to claim 1, wherein processing the data representing the object based upon the plurality of first models comprises: determining a relationship between each of said plurality of first models and said data representing the first object associated with a plurality of locations of said first object; wherein said configuration of the robotic hand for automatically grasping the first object is determined based upon the determined relationships for the plurality of first models.

3. A method according to claim 2, wherein determining a relationship between each of the plurality of first models and the data representing the first object comprises, for each of said first models: determining correspondence between the property of the second object associated with the respective part of the robotic hand and a property of each of the plurality of locations of the first object; wherein said configuration of the robotic hand for automatically grasping the first object is determined based upon the determined correspondence.

4. A method according to claim 1, wherein the property of the second object is a property generated based upon data representing the second object associated with a region of the second object that has a predetermined spatial relationship with the respective part of the robotic hand when the second object is grasped in the example grasp.

5. A method according to claim 4, wherein the predetermined spatial relationship is based upon contact with the respective part of the robotic hand.

6. A method according to claim 1, wherein each of the received plurality of first models represents a relationship between a spatial arrangement of the respective part of the robotic hand relative to the second object and the property of the second object associated with the part of the robotic hand.

7. A method according to claim 1, wherein each of the received plurality of first models comprises a probability density function.

8. A method according to claim 1, wherein the property is a property of a surface of the region of the object, wherein the property is based upon curvature of the surface of the region of the object.

9. A method according to claim 1, wherein processing the data representing the first object comprises determining a relationship between at least one of said plurality of first models and a location associated with said first object based upon said second model.

10. A method according to claim 9, wherein determining a relationship between at least one of said plurality of first models and a location associated with said first object based upon said second model comprises: determining a location associated with a selected one of said first models based upon a relationship between the selected one of said plurality of first models and said data representing the first object; determining a configuration of the robotic hand based upon the determined location associated with the selected one of the first models; and determining a location associated with the at least one of said plurality of first models based upon the determined configuration.

11. A method according to claim 10, further comprising generating a score associated with said determined configuration of the robotic hand, said score being determined based upon a relationship between said at least one of said plurality of first models and said data representing the first object associated with said determined location.

12. A method according to claim 11, further comprising: determining a location associated with each of said plurality of first models based upon the determined configuration; wherein said score is determined based upon a relationship between each of said plurality of first models and the associated locations.

13. A method according to claim 11, further comprising generating a plurality of scores based upon a plurality of determined configurations of the robotic hand, each configuration of the robotic hand being based upon a determined location associated with a different selected one of the first models; wherein said configuration of the robotic hand for automatically grasping the first object is determined based upon said plurality of scores.

14. A method according to claim 1, wherein the relationship between the plurality of parts of the robotic hand represented by the second model comprises a relationship between the plurality of parts of the robotic hand when the robotic hand is in contact with the second object during the example grasp.

15. A method according to claim 1, wherein the relationship between the plurality of parts of the robotic hand represented by the second model comprises a relationship between the plurality of parts of the robotic hand prior to the robotic hand contacting the second object during the example grasp.

16. A method according to claim 1, wherein the data representing the first object comprises image data.

17. A method according to claim 1, wherein said received plurality of first models are generated based upon a plurality of example grasps of a second object, wherein each of said plurality of example grasps being associated with a respective second object.

18. A method according to claim 1, wherein at least two of said plurality of first models represent a relationship between the same part of the robotic hand and a property of the second object associated with said part of the robotic hand and wherein said relationship between a respective part of the robotic hand and a property of the second object associated with said part of the robotic hand is based upon a volume defined relative to the part of the robotic hand, and wherein processing the data representing the first object based upon the plurality of first models comprises combining data associated with a plurality of first models using a product of mixtures approach, and wherein said plurality of models for which data is combined is generated using machine learning techniques.

19. A non-transitory computer program comprising computer readable instructions configured to cause a computer to carry out a method of generating a configuration of a robotic hand for automatically grasping a first object, the robotic hand comprising a plurality of parts, the method comprising:
receiving data representing the first object;
receiving a plurality of first models generated based upon an example grasp of a second object, the example grasp being based upon a configuration of the robotic hand for grasping the second object in which the plurality of parts of said hand contact said second object, each of said plurality of first models representing a relationship between a respective part of the robotic hand and a property of the second object associated with said part of the robotic hand, wherein the relationship is independent of any other part of the robotic hand;
receiving a second model generated based upon the example grasp, the second model representing a relationship between the plurality of parts of the robotic hand; and
processing the data representing the first object based upon the plurality of models and the second model to determine said configuration of the robotic hand for automatically grasping the first object.

20. A computer apparatus for generating a configuration of a robotic hand for automatically grasping a first object, the robotic hand comprising a plurality of parts, the apparatus comprising:
a memory storing processor readable instructions; and
a processor arranged to read and execute instructions stored in said memory;
wherein said processor readable instructions comprise instructions arranged to control the computer to carry out a method comprising:
receiving data representing the first object;
receiving a plurality of first models generated based upon an example grasp of a second object, the example grasp being based upon a configuration of the robotic hand for grasping the second object in which the plurality of parts of said hand contact said second object, each of said plurality of first models representing a relationship between a respective part of the robotic hand and a property of the second object associated with said part of the robotic hand, wherein the relationship is independent of any other part of the robotic hand;

receiving a second model generated based upon the example grasp, the second model representing a relationship between the plurality of parts of the robotic hand; and processing the data representing the first object based upon the plurality of first models and the second model to determine said configuration of the robotic hand for automatically grasping the first object.

\* \* \* \* \*